Nov. 21, 1933.  J. P. TEMPLEMAN  1,935,785
DROP SHAFT BRAKE FOR RAILWAY CARS
Filed Sept. 18, 1930  2 Sheets-Sheet 1
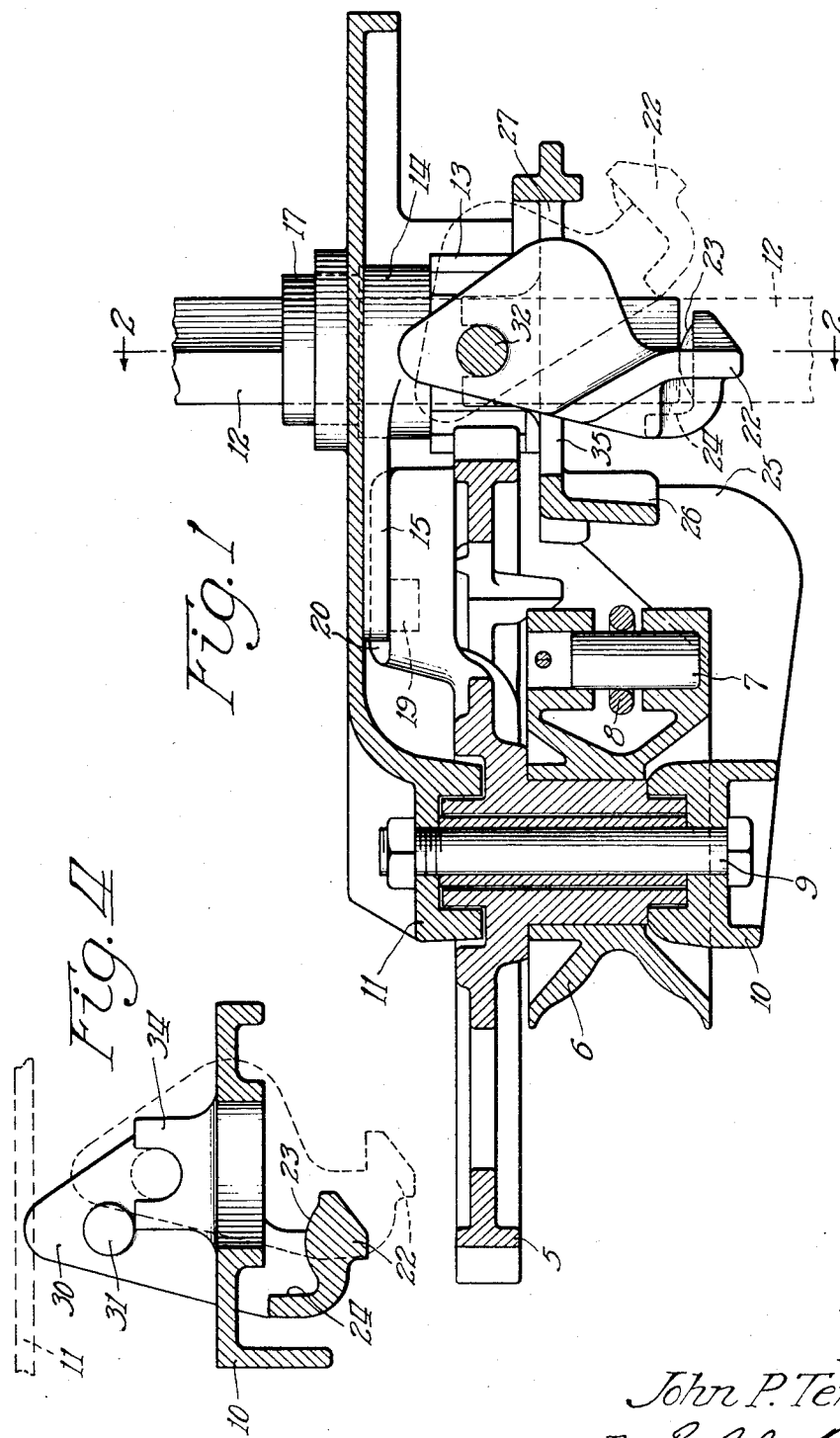
Inventor
John P. Templeman Nov. 21, 1933. J. P. TEMPLEMAN 1,935,785
DROP SHAFT BRAKE FOR RAILWAY CARS
Filed Sept. 18, 1930 2 Sheets-Sheet 2
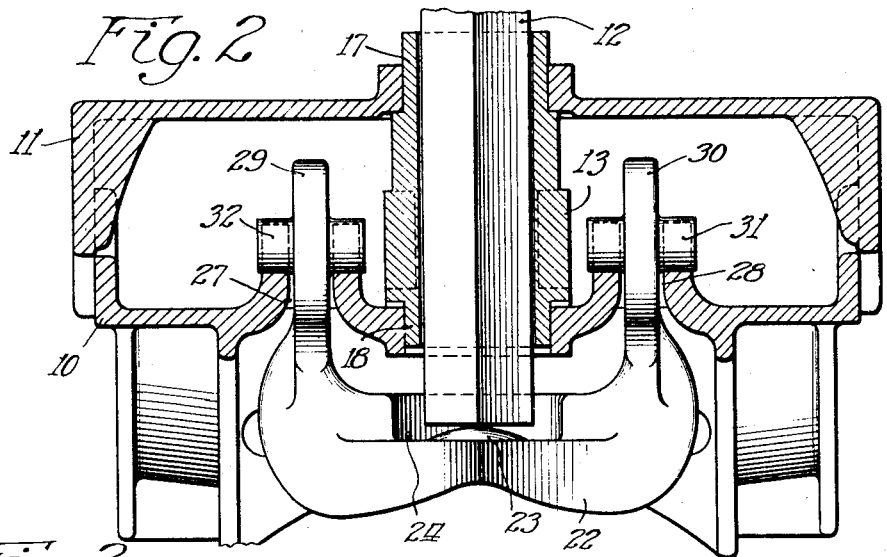
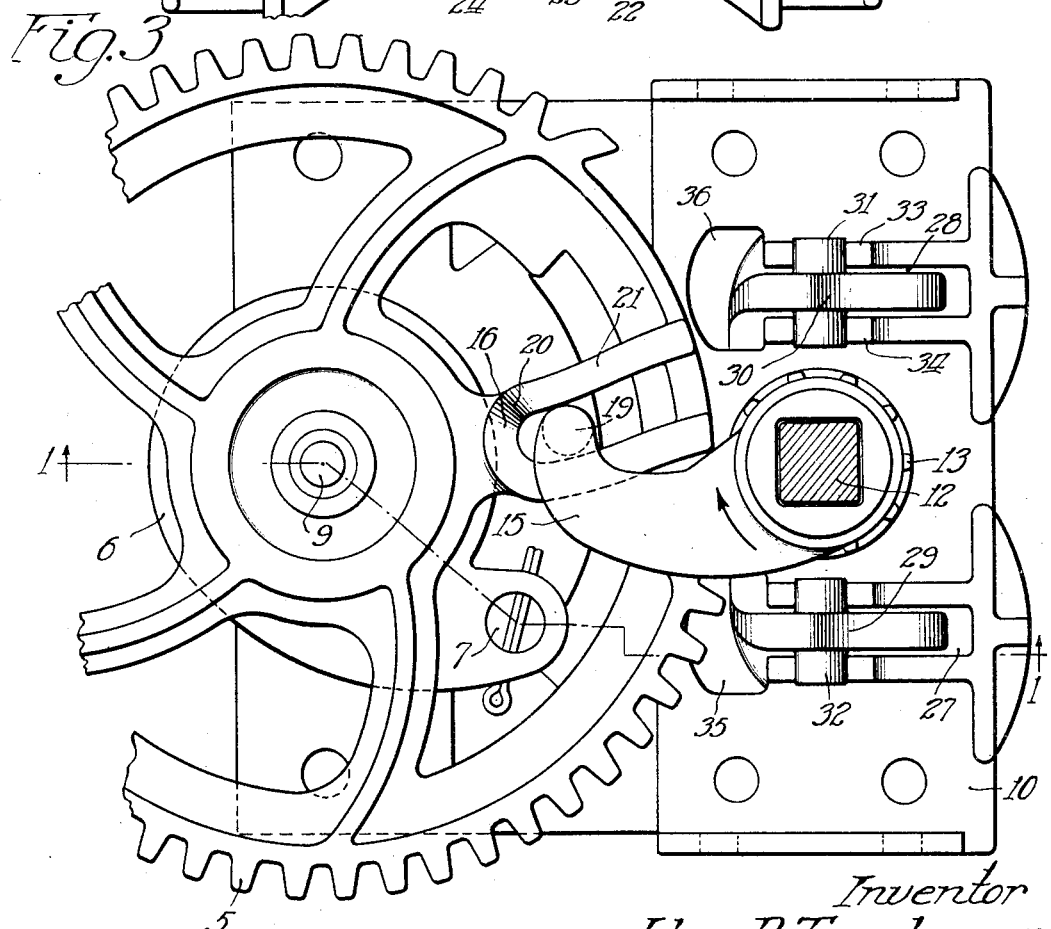
Inventor
John P. Templeman
By Zabel & Bauning Attys.

Patented Nov. 21, 1933

1,935,785

UNITED STATES PATENT OFFICE 1,935,785

DROP SHAFT BRAKE FOR RAILWAY CARS

John P. Templeman, Chicago, Ill.

Application September 18, 1930
Serial No. 482,716

3 Claims. (Cl. 74—113)

My invention relates to brakes for railway cars and the like and has for its principal object the provision of a novel means for supporting the operating shaft of the brake where this shaft is of the drop type.

It is also a purpose of this invention to provide, in a brake of this character including a quick take-up device, a novel means for eliminating one of the serious points of wear that is encountered in connection with such brakes.

More specifically my invention contemplates the provision, in combination with a drop shaft brake operating mechanism, of a novel stirrup for holding the brake shaft in raised position.

Other and more specific objects of the invention will appear as the description proceeds when taken in connection with the accompanying drawings wherein the preferred form of the invention is shown.

In the drawings—

Fig. 1 is a section taken along the line 1—1 of Fig. 3 illustrating the drop brake shaft in combination with the gearing by means of which the brake chain is tightened;

Fig. 2 is a section on the line 2—2 of Fig. 1;

Fig. 3 is a top plan view with the top cover plate of the gearing removed and the brake shaft shown in section;

Fig. 4 is a detailed section illustrating the manner in which the brake shaft holding stirrup is held in place and may be removed.

Referring now in detail to the drawings, this brake is of the general type shown in my Patent No. 1,594,912, issued August 3, 1926, on Hand brake for railway cars.

The numeral 5 indicates the gear which is suitably locked to a drum 6 adapted to be connected by means of pin 7 to a suitable brake chain or cable the end of which is indicated at 8. The brake drum and gear are mounted on pin 9 which also holds the frame members 10 and 11 in assembled position. The gear 5 is driven from the brake shaft 12 by means of the pinion 13 mounted on a suitable hub 14 through which the squared brake shaft extends. The pinion is provided with the projecting arm 15 engaging in the radial cam element 16 formed on the gear wheel to operate, in the manner disclosed in my prior patent,—as a quick take-up device adapted during the initial rotation of the pinion to move the gear rapidly and thus take up the slack in the brake chain. The pinion and arm are, for convenience in the manufacture, made in one piece, and the hub on which they are cast has its opposite ends, as indicated at 17 and 18, journalled in the frame members 10 and 11.

In conjunction with this quick take-up device, I have provided an additional improvement which serves to eliminate the excessive wear and strain on the depending lug or pin 19 which engages in the cam track carried by the gear. It will be noted from an examination of Figs. 1 and 3 that that part of the cam 16 which passes under the arm 15 is cut away or lowered an amount substantially equal to the thickness of the arm. This cut away portion extends around the end of the cam to about the point 20, and the remainder 21 of the cam extends up so as to overlap the arm 15. Thus, when the pinion 13 is rotated in the direction indicated by the arrow in Fig. 3, to tighten the brake, the force is directed not against the pin 19 particularly but directly against the end of the arm, so that the wearing of this surface does not weaken the pin to the point where it will break off when the brakes are applied. The pin itself is only subjected to the small amount of force necessary to return the gear to original starting position which, of course, is never very great and would not affect the life of the brake by wearing away the pin.

Now in order to hold the drop shaft in position, I provide a stirrup 22 which, as shown, is provided with a seat at 23 adapted to receive the lower end of the shaft and a rib 24 at the back which effectively prevents the stirrup from swinging outwardly and allowing the brake shaft to drop down between it and the depending portion 25 of the frame member 10. From an inspection of Fig. 1, it will appear that this frame member 10 is spaced far enough as indicated at 26 to allow the stirrup 22 to swing to the left, as shown in Fig. 1, enough to clear the shaft and allow it to drop down when it is lowered out of operating position. The lower frame member 10 is cast with the openings such as indicated at 27 and 28 through which the legs 29 and 30 of the stirrup 22 extend, and these legs have formed thereon the stub shafts such as indicated at 31 and 32 to engage in the upwardly extending bearings 33 and 34 formed on the lower frame member 10. The bearings preferably project up far enough, as indicated in Fig. 4, so that once the stirrup is placed in position and the upper frame member 11 mounted in place the upper ends of the lugs 29 and 30 will strike this upper frame member before the stub shafts on the legs will clear the side projections of the bearings.

Thus it is impossible for the stirrup to get out of place after it is once assembled without removing the cover 11, and yet no bolts or nuts are required in assembling the stirrup with the rest of the brake. The stirrup is inserted by passing the legs upwardly through the openings 27 and 28 with the projecting stub shafts 31 and 32 going through the enlarged portions 35 and 36 of the openings 27 and 28 which are sufficiently large to allow these stub shafts and the ends of the legs to pass upwardly therethrough. After having passed upwardly through this, the stub shafts can then be moved into position to drop into the bearings after which the cover 11 can be mounted in place.

This makes a very strong and rugged assembly which can be readily taken apart by the removal of the cover if for any reason it becomes necessary to remove the stirrup. It also permits the making of the supporting portions of the stirrup sufficiently strong and rugged to avoid any danger of breakage or sticking due to tight fitting shafts or anything of that sort.

The stirrup is naturally held by gravity in the position shown in Fig. 1, and the shaft can be dropped from raised position into lowered position by merely pushing the stirrup to the left from the position shown in Fig. 1 until the shelf 23 clears the lower end of the shaft; and, immediately upon raising the shaft, the stirrup will swing into position to lock the shaft in raised position.

While I have described one form which my invention may take, it is obvious that various minor modifications may be made without departing from the scope of the invention, and it is to be understood that the drawings and description are illustrative only and are not to be taken as limiting the invention except in so far as it is limited by the claims.

Having thus described my invention, what I claim as new and desire to secure by Letters Patent is:

1. A drop shaft brake construction including a housing, a brake shaft slidable vertically through said housing, and means for releasably holding said shaft in raised position comprising a stirrup pivoted to normally underlie said housing and having a seat for receiving the lower end of said shaft, said stirrup being swingable out of the path of said shaft, and having a shoulder thereon to aid in returning the shaft thereon.

2. In a drop shaft brake, a housing including upper and lower plate members, a brake shaft vertically slidable through said housing, and a stirrup for holding said shaft in raised position having a base portion provided with a seat, and leg portions extending upwardly and provided with trunnions, said lower plate member having apertures therein permitting passage of said shafts upwardly therethrough and having bearings formed thereon detachably receiving said trunnions.

3. In a drop shaft brake, a housing including upper and lower plate members, a brake shaft vertically slidable through said housing, and a stirrup for holding said shaft in raised position having a base portion provided with a seat, and leg portions extending upwardly and provided with stub shafts, said lower plate member having apertures therein permitting passage of said shafts upwardly therethrough and having bearings formed thereon detachably receiving said stub shafts, said upper plate member cooperating with said legs to prevent removal of said shafts from said bearings while the upper plate member is in place.

JOHN P. TEMPLEMAN.